United States Patent [19]

Toukura

[11] Patent Number: 5,685,800

[45] Date of Patent: Nov. 11, 1997

[54] CONTROL DEVICE FOR ENGINE FUEL SUPPLY

[75] Inventor: Nobusuke Toukura, Yokohama, Japan

[73] Assignee: Nissan Motor Co., Ltd., Kanagawa, Japan

[21] Appl. No.: 606,250

[22] Filed: Feb. 23, 1996

[30] Foreign Application Priority Data

Mar. 16, 1995 [JP] Japan .................... 7-056950

[51] Int. Cl.$^6$ .................................... B60K 41/00
[52] U.S. Cl. .................. 477/90; 477/38; 477/39; 477/107; 477/111; 123/481
[58] Field of Search ................ 477/38, 39, 90, 477/107, 111, 123; 123/481

[56] References Cited

U.S. PATENT DOCUMENTS

| | | | |
|---|---|---|---|
| 4,061,055 | 12/1977 | Iizuka et al. | 477/107 X |
| 4,580,465 | 4/1986 | Omitsu | 477/107 X |
| 5,199,399 | 4/1993 | Shibuya | 477/111 |
| 5,597,371 | 1/1997 | Toukura | 477/111 |

FOREIGN PATENT DOCUMENTS 60-81446  5/1985  Japan .

*Primary Examiner*—Charles A. Marmor
*Assistant Examiner*—Nathan O. Jensen
*Attorney, Agent, or Firm*—Lowe, Price, LeBlanc & Becker

[57] ABSTRACT

In an engine of an automobile, when fuel injection is restarted by the operation of the accelerator pedal from the state in which fuel supply has been cut off during deceleration, fuel injection is controlled according to one of a plurality of fuel injection patterns, which specify a specific cylinder for fuel injection and a specific cylinder for which fuel is not to be injected, and which correspond with various speed change ratios. The engine output torque is kept smooth by performing fuel injection according to that one of these patterns which corresponds to the speed change ratio when the accelerator pedal is operated. Preferably, the fuel injection patterns are determined starting from whichever cylinder initially comes up for fuel injection. Thereby it is possible to attenuate fore and aft vibration of the vehicle immediately after fuel injection is restarted by operation of the accelerator pedal, especially when a direct connection system is provided which has put the engine and the speed change device into the directly connected state during deceleration.

5 Claims, 7 Drawing Sheets

| SPEED CHANGE RATIO RANGE | FUEL INJECTION PATTERN RCVPTN |
|---|---|
| MIN. ratio | 100111111111 |
| ~ ratioA | 110111111111 |
| ~ ratioB | 110011111111 |
| ~ ratioC | 111101111111 |
| ~ ratioD | 111110011111 |
| ~ ratioE | 111111011111 |
| ~ ratioF | 111111101111 |
| ~ MAX. ratio | 111111100111 |

1=ON : 0=OFF

FIG. 7

CONTROL DEVICE FOR ENGINE FUEL SUPPLY

FIELD OF THE INVENTION

This invention relates to a multi-cylinder engine which is provided with a fuel injection system for each cylinder separately and more particularly to fuel supply control for such an engine when, from a state in which the fuel is cut off, the supply of fuel is restarted.

BACKGROUND OF THE INVENTION

With an engine for an automobile, it is per se known to cut off the supply of fuel to the engine, in the state in which the driver is not depressing the accelerator pedal, i.e. when the throttle valve is fully closed, and in which furthermore the engine rotational speed is greater than a predetermined value. By doing this, fuel economy is enhanced and also the amount of hydrocarbon emission is reduced.

When from this state the driver depresses the accelerator pedal in order to accelerate the engine, the system reverts from the fuel cut off state to the normal fuel injection state; but torsional vibrations are liable to be generated in the vehicle drive system at this time, due to stepwise or abrupt variation of the output torque of the engine, if the vehicle is equipped with a manual transmission or with an automatic transmission which has a lock up clutch which is engaged during vehicle deceleration. Such torsional vibrations shake the vehicle in the fore and aft direction and create an uncomfortable driving feeling for the vehicle occupants.

In relation to this problem, Tokkai Sho 60-81446 published by the Japanese Patent Office in 1985 discloses a fuel injection control device which reduces torsional vibrations in the vehicle drive system by, when the fuel supply is being restarted, delaying the restarting of fuel supply to some but not all of the cylinders of the engine, thus smoothing the variations of the engine output torque which accompany the restarting of the fuel supply.

In this case, the cylinders for which the restarting of the supply of fuel is delayed are always the same ones. However, the phases of the fore and aft vibrations of the vehicle which are generated in accompaniment with the restarting of the fuel supply alter according to the characteristic frequency of vibration of the vehicle drive system, which varies according to the current gear ratio. With this device, accordingly, the fore and aft vibrations of the vehicle may not effectively be reduced, due to variations in the gear ratio when the fuel supply is restarted.

Further, in the case of a vehicle which is equipped with a continuously variable transmission (CVT), the speed change ratio is immediately changed down to a low speed change ratio in accompaniment with the restarting of the fuel supply. This alteration of speed change ratio temporarily exerts a negative torque upon the vehicle drive shafts, and this negative torque further amplifies the fore and aft vibration of the vehicle, when it is superimposed upon the component in the negative direction of such fore and aft vibration of the vehicle.

SUMMARY OF THE INVENTION

It is therefore an object of this invention to reduce torsional vibration of the vehicle drive mechanism when the fuel supply is restarted.

In order to achieve the above object, this invention provides a fuel supply control device for such an engine that has a plurality of cylinders for which fuel injection is performed individually in a fixed order, and that is connected to a mechanism for transmitting a rotation of the engine at a speed change ratio selected from a plurality of candidate ratios. The device comprises an accelerator mechanism, a mechanism for supplying fuel to be injected into the cylinders in response to operation of the accelerator mechanism, a mechanism for stopping the supply of fuel by the fuel supply mechanism when a predetermined fuel supply stoppage condition holds, a mechanism for storing, according to speed change ratios, a plurality of fuel injection patterns which determine a specific cylinder for which fuel is to be injected and a specific cylinder for which fuel is not to be injected, a mechanism for selecting in the storing mechanism a fuel injection pattern which corresponds to the selected speed change ratio when the accelerator mechanism is operated after the stopping mechanism has stopped the fuel supply, and a mechanism for controlling the supplying mechanism so as to bring the fuel injection to be performed based on the selected fuel injection pattern.

It is preferable that the transmitting mechanism comprises a continuously variable transmission.

In this case, it is further preferable that the continuously variable transmission and the engine are connected together via a torque converter which comprises a lock up clutch which directly connects together the transmission and the engine, and that the control of the fuel supply mechanism by the control mechanism is limited to the condition when the transmission and the engine are directly connected together by the lock up clutch.

It is also preferable that, in the fuel injection patterns, the specific cylinders for which fuel is to be injected and the specific cylinder for which fuel is not to be injected are determined according to a fuel injection order from a cylinder from which fuel injection is to be resumed.

It is also preferable that the control mechanism controls the fuel supply mechanism only during a predetermined time period after the accelerator mechanism is operated.

The details as well as other features and advantages of this invention are set forth in the remainder of the specification and are shown in the accompanying drawings.

BRIEF DESCRIPTION OF THE DRAWINGS

FIG. 7 is a diagram showing various patterns of fuel injection corresponding to speed change ratio, according to this invention.

DESCRIPTION OF THE PREFERRED EMBODIMENT

Figure 1:
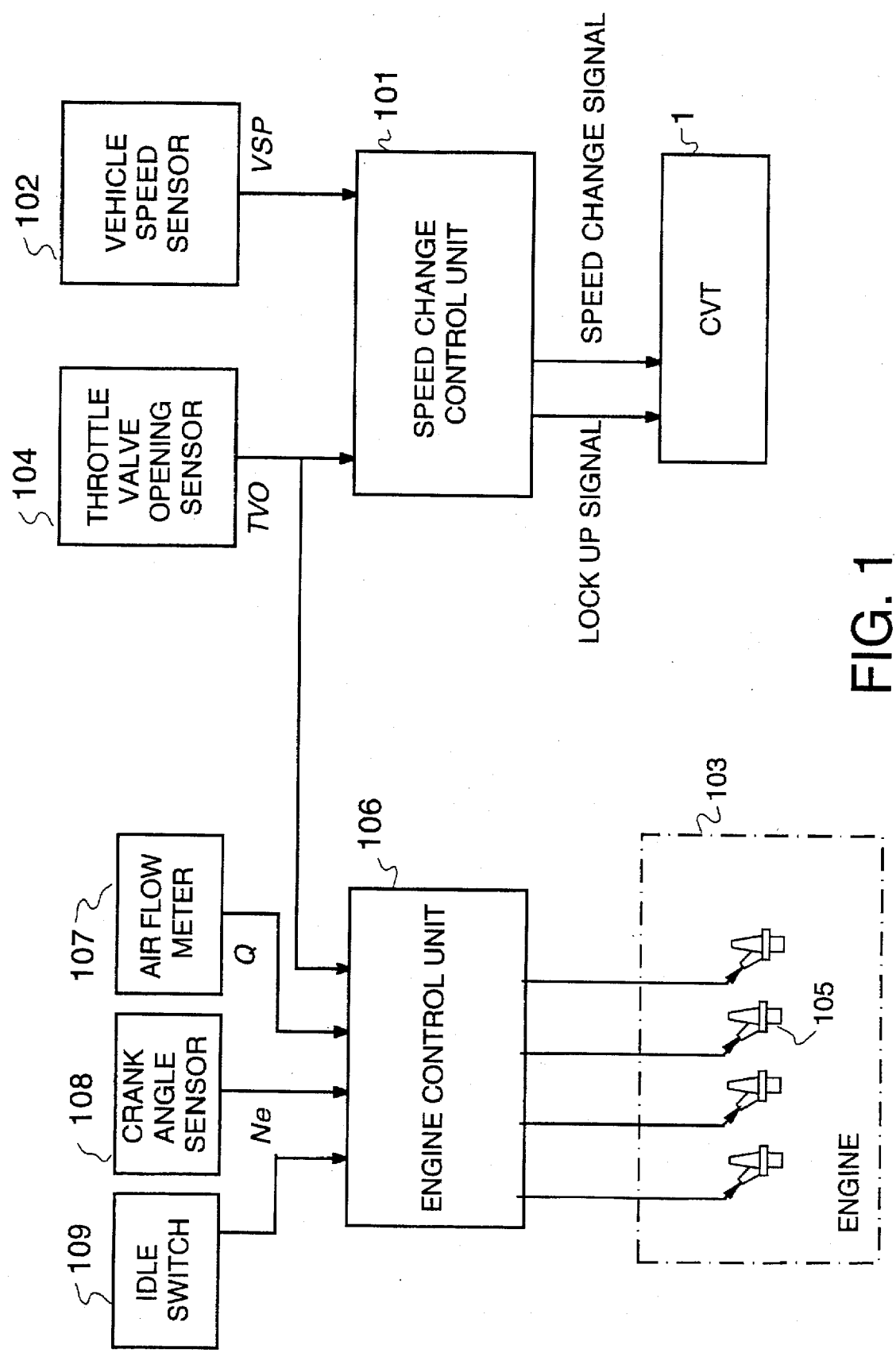
FIG. 1 is a schematic block diagram of a fuel supply control device according to this invention.

Referring to FIG. 1 of the drawings, a multi-cylinder engine 103 comprises an electromagnetic fuel injection valve 105 for each of its cylinders. The amount of fuel injected by each of the fuel injection valves 105 is controlled by an engine control unit 106. In order to do so, the signals from a throttle valve opening sensor 104, an air flow meter 107, a crank angle sensor 108, and an idle switch 109 are input to the engine control unit 106. The engine control unit 106 may for example comprise a microcomputer which comprises a CPU, a ROM, a RAM, and an I/O interface.

The throttle valve opening sensor 104 detects the opening amount, which corresponds to the amount by which the accelerator pedal of the vehicle is depressed, of a throttle valve (not particularly shown) which regulates the amount of intake air of the engine. The air flow meter 107 detects the intake air amount Qa. The crank angle sensor 108, each time a crankshaft connected to the engine but not shown in the figures rotates through a predetermined angle and each time said crankshaft executes one complete revolution, outputs signals respectively corresponding thereto, and the engine control unit 106 calculates the engine rotational speed Ne from the latter signals. And the idle switch 109 outputs an ON signal when the throttle valve opening is zero, i.e. when the throttle valve is fully closed.

The engine control unit 106 calculates a basic injection pulse width Tp based upon the intake air amount Qa detected by the air flow meter 107 and upon the engine rotational speed Ne obtained from the output signal of the crank angle sensor 108. Further, it determines a final injection pulse width Ti after making corrections according to various driving conditions, such as the temperature of the engine cooling water. A fuel injection pulse signal which includes this pulse width Ti is output to each of the fuel injection valves 105, and fuel is injected from each of the fuel injection valves 105 in an amount which corresponds to the pulse width Ti. The fuel injection valves 105 and the engine control unit 106 together constitute fuel supply means.

The engine control unit 106 further, in predetermined conditions, shuts off the injection of fuel via the fuel injection valves 105 to all of the cylinders, thus serving as fuel supply stopping means.

These predetermined conditions are that the idle switch 109 is ON, i.e. the throttle valve opening amount is zero, and that the engine rotational speed Ne is greater than a predetermined value. When the idle switch 109 is turned OFF, or when the engine rotational speed Ne drops below the predetermined value, then the supply of fuel is restarted.

Figure 2:
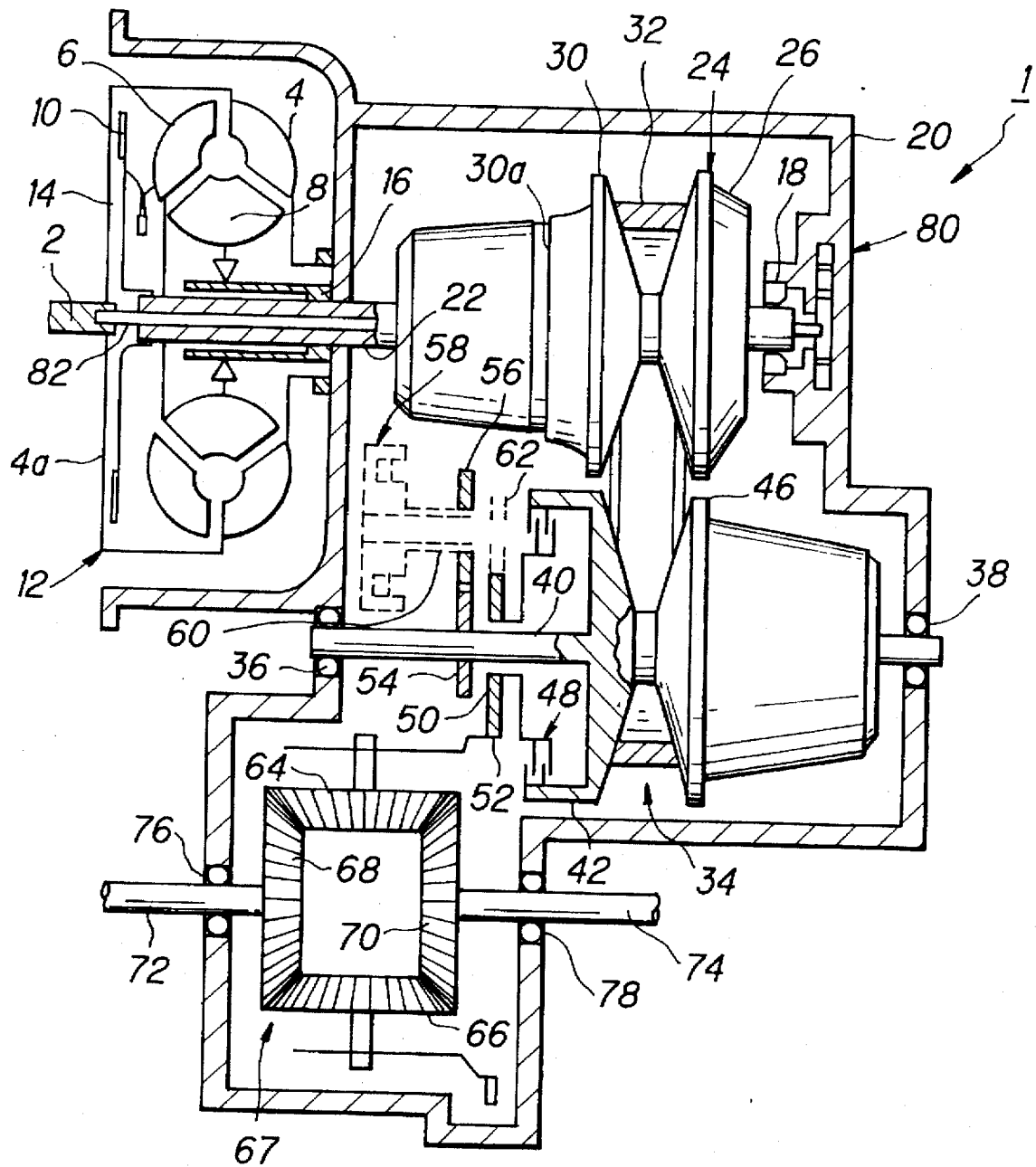
FIG. 2 is a sectional view of a continuously variable transmission which is combined with the fuel supply control device according to this invention.

The rotation of the engine 103 is transmitted to the vehicle driving wheels via a continuously variable transmission (CVT) 1. The construction of the CVT 1 is shown in FIG. 2.

This CVT 1 comprises a fluid type torque converter 12. The torque converter 12 comprises an engine output shaft 2 which rotates in accordance with the engine crankshaft which is not shown in the figures, a pump impeller 4, a turbine 6, a stator 8, and a lock up clutch 10.

The lock up clutch 10 is connected to the turbine 6 and is supported so as to be movable in the axial direction. A hydraulic chamber 14 is defined between the lock up clutch 10 and a member 4a which is integral with the pump impeller 4 and fixed on the engine output shaft 2. When the hydraulic pressure in this hydraulic chamber 14 drops so as to be below the hydraulic pressure in the interior of the torque converter 12, then the lock up clutch 10 is pushed against the member 4a so as to be engaged therewith, squeezing down the hydraulic chamber 14, and thus the lock up clutch 10 is brought to the state of being directly connected to the member 4a.

The turbine 6 is engaged by splines on one end of a drive shaft 22. The drive shaft 22 is supported via bearings 16 and 18 by a casing 20 so as to be freely rotatable therein. And the drive shaft 22 supports a drive pulley 24 between these bearings 16 and 18.

The drive pulley 24 comprises a fixed conical disk 26 which is fixed upon the drive shaft 22 and a movable conical disk 30 which is mounted upon the outer surface of the drive shaft 22 and which can be displaced along the axial direction thereof in response to hydraulic pressure. The conical faces of the fixed conical disk 26 and of the movable conical disk 30 mutually confront one another, so that a V-shaped groove is defined between these conical faces.

The drive pulley 24 is coupled to a driven pulley 34 via a V-belt 32. The driven pulley 34 is mounted upon a driven shaft 40 which is supported by pulleys 36 and 38 in the casing 20 so as to be freely rotatable therein.

The driven pulley 34 comprises a fixed conical disk 42 which is fixed upon the driven shaft 40 and a movable conical disk 46 which is mounted upon the outer surface of the driven shaft 40 and which can be displaced along the axial direction thereof in response to hydraulic pressure. A V-shaped groove is defined between the mutually confronting conical faces of the fixed conical disk 42 and the movable conical disk 46.

The fixed conical disk 42 is connected to a forward drive gear 50 via a forward drive multi-plate clutch 48. The forward drive gear 50 is supported upon the outer surface of the driven shaft 40 so as to be freely rotatable thereon, and is meshed with a ring gear 52 which is arranged so that its rotational axis is parallel to that of the driven shaft 40.

Further, a reverse drive gear 54 is fixed upon the driven shaft 40. This reverse drive gear 54 is meshed with an idler gear 56. The idler gear 56 is connected to an idler shaft 60 via a reverse drive multi-plate clutch 58. And another idler gear 62 is fixed upon the idler shaft 60, and is meshed with the ring gear 52.

The ring gear 52 is provided with a pair of pinions 64 and 66 which are coaxial. These pinions 64 and 66 and a pair of side gears 68 and 70, each of which is meshed with both of the pinions 64 and 66, constitute a differential unit 67. An output shaft 72 which is supported by a bearing 76 is connected to the side gear 68, while an output shaft 74 which is supported by a bearing 78 is connected to the side gear 70.

These output shafts 72 and 74 are connected to vehicle road wheels not particularly shown in the figures.

Hydraulic pressure for displacing the lock up clutch 10 and the movable conical disks 30 and 46 is selectively supplied, as appropriate, from a hydraulic pump 18. The hydraulic pump 18 is an internal gear wheel type pump, and rotates in accordance with the engine output shaft 2 by being connected therewith via a hydraulic pump drive shaft 82 which axially passes through the drive shaft 22.

The rotation of the engine output shaft 2 is transmitted to the torque converter 12, thence to the drive shaft 22, thence to the drive pulley 24, thence to the driven pulley 34 via the V-belt 32, and thence to the driven shaft 40.

When the forward drive multi-plate clutch 48 is engaged and the reverse drive multi-plate clutch 58 is released, this rotation of the driven shaft 40 is transmitted via the forward drive gear 50, the ring gear 52, and the differential unit 67 to the output shafts 72 and 74 so as to rotate them in the forward rotational direction.

On the other hand, when the forward drive multi-plate clutch 48 is released and the reverse drive multi-plate clutch 58 is engaged, this rotation of the driven shaft 40 is transmitted via the reverse drive gear 54, the idler gear 56, the idler shaft 60, the idler gear 62, the ring gear 52, and the differential unit 67 to the output shafts 72 and 74 so as to rotate them in the reverse rotational direction.

Further, during these transmissions of driving force, the movable conical disk 30 of the drive pulley 24 and the movable conical disk 46 of the driven pulley 34 are displaced along the directions of their shafts so that the contact regions between the V-belt 32 and these pulleys thereby come to be appropriately changed, and thereby the rotation ratio between the drive pulley 24 and the driven pulley 34, i.e. the speed change ratio provided thereby, is changed.

For example, if the width of the V-shaped groove of the drive pulley 24 is widened and the width of the V-shaped groove of the driven pulley 34 is narrowed, then the radius of the contact region between the drive pulley 24 and the V-belt 32 is reduced, while the radius of the contact region between the driven pulley 34 and the V-belt 32 is increased. As a result, the speed change ratio is increased. If the movable conical disks 30 and 46 are displaced in the opposite directions, the speed change ratio is reduced.

The lock up clutch 10 of the torque converter 12 is operated by lowering of the pressure in the hydraulic chamber 14. That is, when the hydraulic chamber 14 is maintained at a relatively high pressure, the lock up clutch 10 and the member 4a are able freely to rotate with respect to one another, while on the other hand, when the hydraulic chamber 14 is drained, the engine output shaft 2 and the drive shaft 22 are directly mechanically linked together via the lock up clutch 10 and the member 4a, which are mutually engaged together.

A speed change control unit 101 which comprises a microcomputer is provided in order to control the speed change ratio of the CVT 1 and in order to operate the lock up clutch 10.

The output signals from a vehicle speed sensor 102 which detects the vehicle speed VSP and from the previously described throttle valve opening sensor 104 are input to the speed change control unit 101. The speed change control unit 101 performs positional control of the movable conical disks 30 and 46 by appropriate supply of actuating hydraulic pressure, so as to bring the actual speed change ratio to agree with a target speed change ratio which it sets based upon the vehicle speed VSP and upon the throttle valve openings TVO.

Further, the speed change control unit 101 decides whether to engage or release the lock up clutch 10, based upon the vehicle speed VSP and upon the throttle valve opening TVO, and controls the hydraulic pressure in the hydraulic chamber 14 according to the result of this decision.

Figure 3:
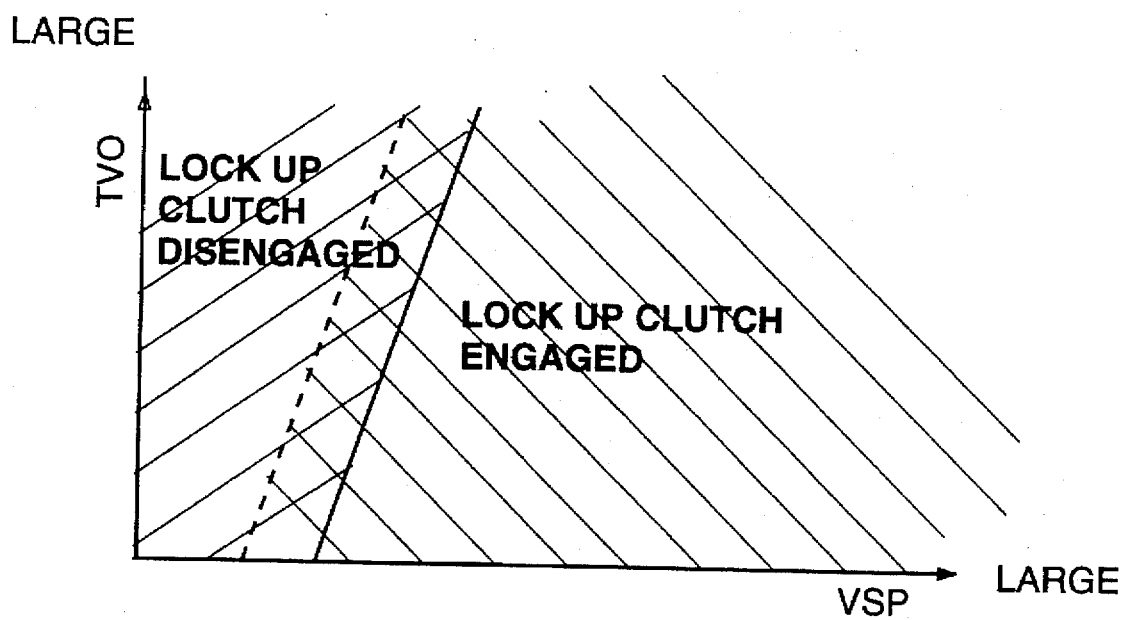
FIG. 3 is a diagram showing engagement and disengagement regions for a lock up clutch according to this invention.

Now, as shown in FIG. 3, the lock up clutch 10 is engaged in all operational regions, except in the extremely low speed region such as for example just after the vehicle has started off from rest. Further, this engaged state for the lock up clutch 10 is maintained during vehicle deceleration with the throttle valve fully closed, until the vehicle speed VSP has dropped to an extremely low speed region.

Accordingly, the vehicle speed lock up clutch 10 is kept engaged even when the accelerator pedal is depressed in order to accelerate the vehicle from the state in which the fuel supply to the engine was cut off by, for example, the accelerator pedal having been released while the vehicle was moving so that the vehicle decelerated. As a consequence, torsional vibrations might be liable to be generated in the output shafts 72 and 74, due to the sudden change of the engine output torque caused by the restarting of the supply of fuel.

Figure 4:
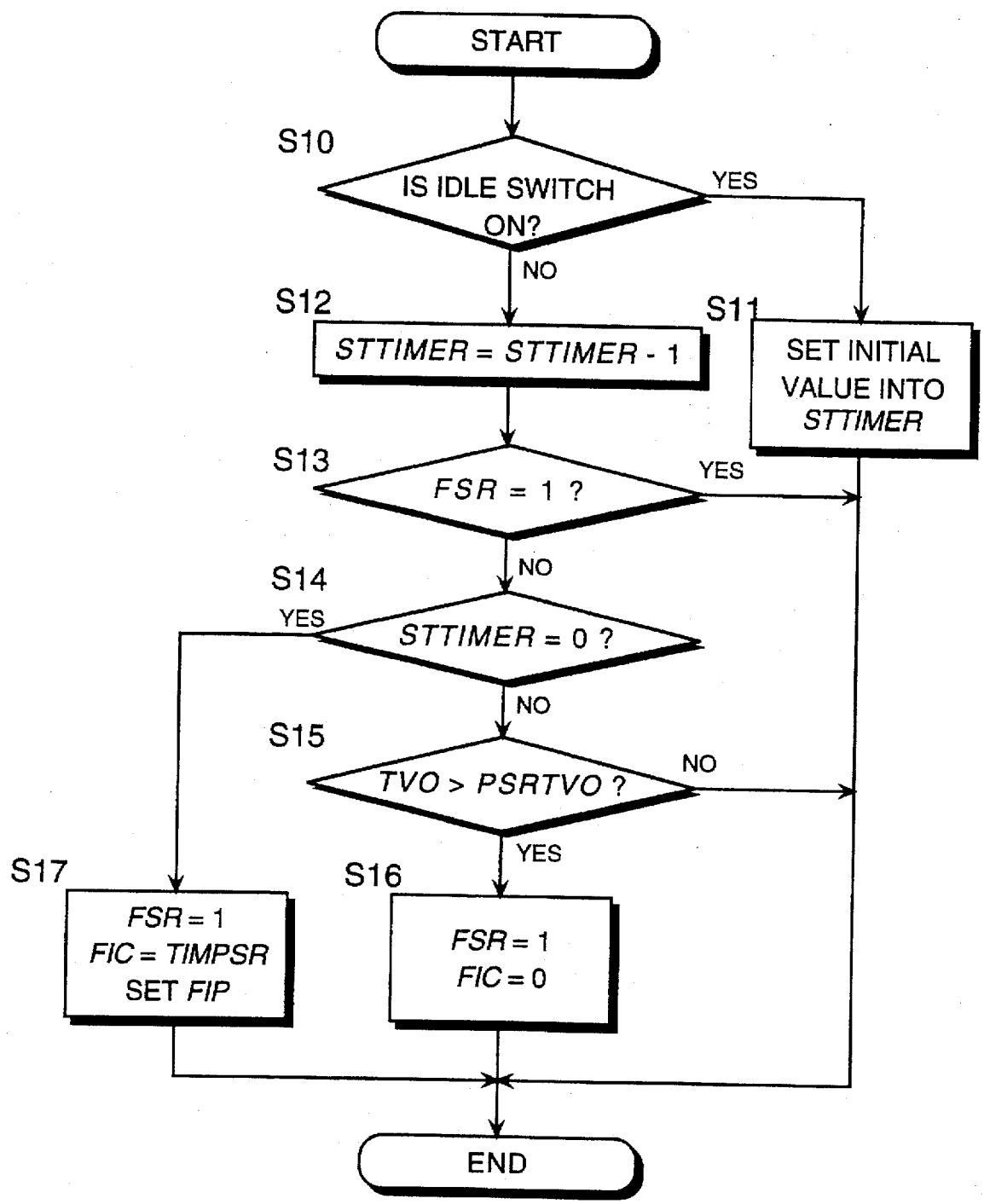
FIG. 4 is a flow chart describing a process of determining fuel supply restarting, according to this invention.
Figure 5:
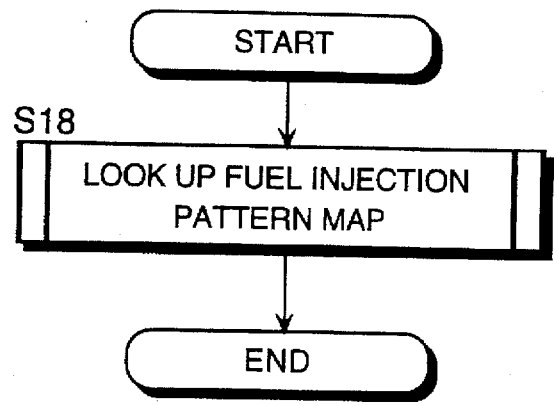
FIG. 5 is a flow chart describing a fuel injection pattern lookup process, according to this invention.
Figure 6:
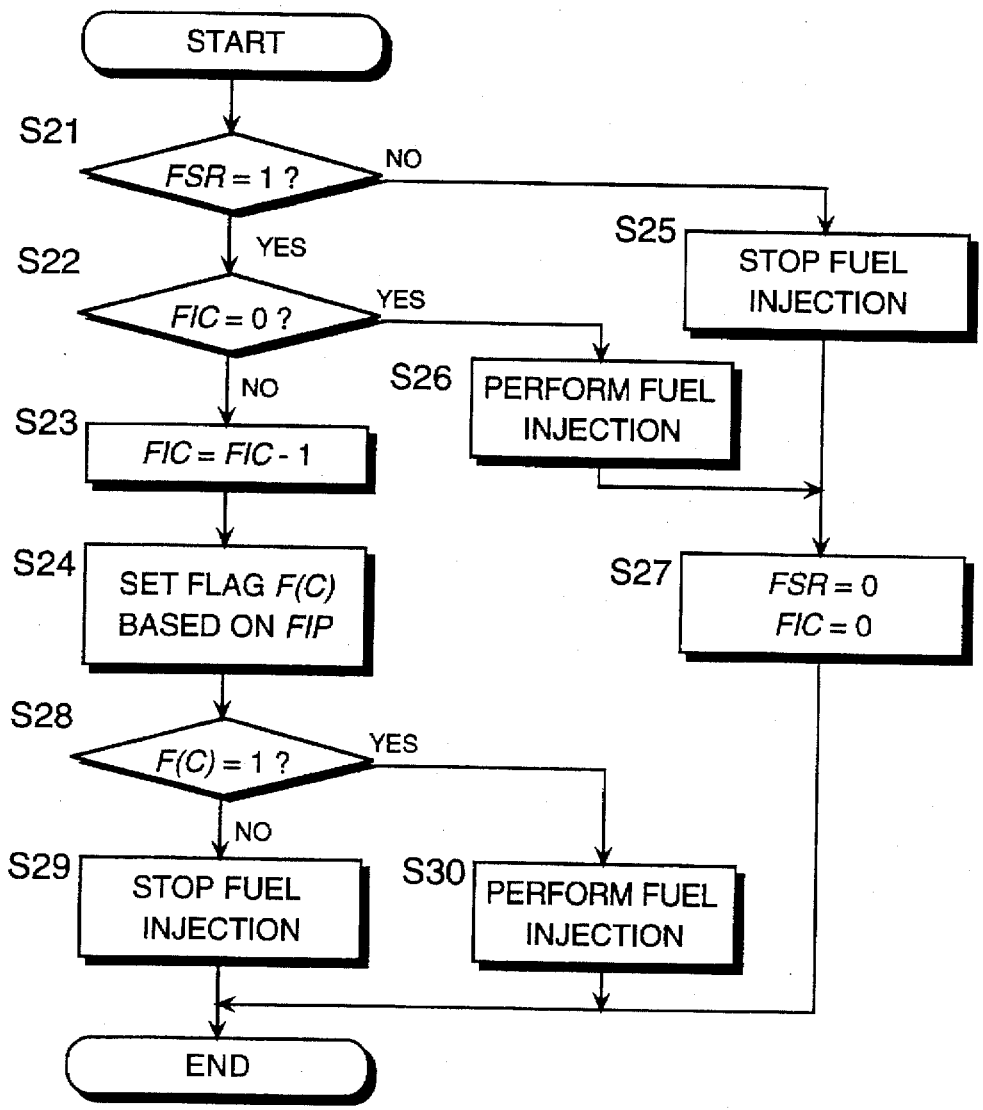
FIG. 6 is a flow chart describing a fuel injection control process performed when restarting the supply of fuel, according to this invention.

With this invention, in the case of accelerating from the state in which the supply of fuel is cut off, the engine control unit 106 controls the injection of fuel according to the flow charts of FIGS. 4 through 6, so that this torsional vibration is reduced or eliminated.

FIG. 4 shows a routine which is executed in the fuel cutoff state during deceleration, in order to decide whether or not to restart the fuel supply, based upon the throttle valve opening amount.

First in the step S10 a decision is made as to whether the idle switch 109 is ON or OFF. If it is ON, then, since the accelerator pedal is not being depressed, in the step S11 a predetermined value is set into the timer value STTIMER, and this routine terminates.

If the idle switch 109 is OFF, then, since this means that the accelerator pedal is being depressed, in the step S12 the timer value STTIMER is counted down (decremented). By doing this, the elapsed time from the time point at which the idle switch 109 was turned from ON to OFF is measured.

In the step S13 a decision is made as to whether or not a fuel supply restart flag FSR is set to 1. If this flag is set, then this routine is terminated without further action, since the fuel supply has already been restarted.

If the flag FSR is not set, then the flow of control proceeds to the step S14, in which a decision is made as to whether or not the timer value STTIMER is zero, that is to say, as to whether or not a predetermined time period has elapsed since the time point at which the idle switch 109 was turned from ON to OFF.

If the timer value STTIMER is not zero, i.e. if the predetermined time interval has not elapsed, then the flow of control proceeds to the step S15, and a decision is made as to whether or not the throttle valve opening TVO is greater than a predetermined opening amount PSRTVO. This predetermined opening amount PSRTVO is a value which has been determined according to vehicle speed as a throttle valve opening amount condition for release of the lock up clutch 10. In summary, even if the throttle valve has been opened by operation of the accelerator pedal, if this throttle valve opening amount TVO is less than PSRTVO, then this shows that the throttle valve has not been opened up sufficiently for the lock up clutch 10 to be released. Even in this case, since there is a possibility that the throttle valve opening TVO might exceed PSRTVO during the time period which elapses until the timer value STTIMER becomes zero, this routine terminates without setting to 1 the flag FSR which shows fuel supply restart.

If in the step S15 the throttle valve opening TVO is found to be greater than PSRTVO, then in the step S16 the fuel supply restart flag FSR is set to 1. At the same time, the fuel injection counter FIC is reset.

When the supply of fuel is restarted from the fuel cut off state, although as will be described hereinafter fuel injection is performed only to a selected set of the cylinders according to a predetermined pattern, the fuel injection counter FIC is provided so as to be set in order to count the number of times fuel injection is performed. Accordingly, when the fuel injection counter FIC is zero, this is taken as meaning that the time period for fuel injection according to the above described predetermined pattern has terminated, and thenceforward fuel is injected to all of the cylinders.

When the throttle valve opening TVO is greater than PSRTVO, this is in a case such as when together with the release of the lock up clutch 10 the supply of fuel is restarted by the throttle valve being opened up, or such as when from the state in which the lock up clutch 10 is already released the accelerator pedal is depressed and fuel supply is restarted, and in these cases fuel is injected to all of the cylinders directly without any fuel injection episode according to the above described predetermined pattern being performed. This is because when the lock up clutch 10 is in the released state the engine output is transmitted to the CVT 1 via the fluid type torque converter 12, so that, since the torque converter 12 absorbs any stepwise or abrupt variation of the output torque, it is not necessary to moderate this output torque variation by any special pattern for the injection of the fuel.

If the throttle valve opening TVO has not risen to be greater than PSRTVO over the predetermined time period, this shows that the fuel supply is restarted with the torque converter 12 remaining in its directly connected state without the lock up clutch 10 being released, even though the throttle valve has been opened by the accelerator pedal being depressed and the condition has occurred for the fuel supply to be restarted.

In this condition, since the engine and the CVT are directly connected together, any sudden variation of the output torque of the engine will generate fore and aft vibration of the vehicle. Thus, in this case, the fuel supply is restarted based upon a predetermined pattern after the temporary stoppage of fuel injection. After a fixed time period has elapsed thereafter, the system shifts over to providing injection of fuel to all of the cylinders.

In this case the flow of control proceeds to the step S17 from the step S14, and the fuel supply restart flag FSR is set to 1, while on the other hand the fuel injection counter FIC is set to a predetermined value TIMPSR and the fuel injection pattern FIP is set.

The fuel injection pattern FIP is data, as for example like that shown in FIG. 7, specified by bit information in cylinder fuel injection order starting from the cylinder for which fuel injection happens to come first after the restarting of fuel supply has been ordered, and shows, for each cylinder in order, whether fuel injection is to be performed or not. In this figure, "1" denotes a cylinder for which fuel injection is to be performed, while "0" denotes a cylinder for which fuel injection is not to be performed. Several sets of this pattern data are provided, and these sets are stored in the ROM in advance according to the corresponding ranges of the speed change ratio.

Accordingly, setting of the fuel injection pattern FIP means, as shown in the step S18 of FIG. 5, reading out the pattern which corresponds to the current speed change ratio from the ROM, and storing it in the RAM.

Fuel injection patterns are set differently for different ranges of the speed change ratio, so as best not to excite torsional vibration in the drive system, in view of the fact that each ratio range has its own characteristic frequency of vibration. Accordingly, at whatever speed change ratio the restarting of the supply of fuel is performed, it is difficult for torsional vibration in the drive system to be excited, and fore and aft vibration of the vehicle is effectively reduced.

Since this data is provided in the form of a bit pattern for distinguishing the fuel injected cylinders from the non fuel injected cylinders, therefore, provided that the speed change ratio is the same, the fuel is always injected according to the same pattern, irrespective of at which cylinder the fuel injection is restarted.

Temporarily, when the fuel supply restart flag FSR is set to 1, as shown in FIG. 4, the subsequent processing is performed without passing via the step S17. Accordingly, even if the speed change ratio changes along with the depression of the accelerator pedal, the fuel injection is performed according to the pattern which is based upon the speed change ratio at the time that the decision to restart fuel injection is made. The fact that the pattern is not altered in response to change of the speed change ratio after the restarting of fuel injection is because there would be a possibility that, as the pattern was switched from the pattern before the speed change ratio change to the pattern after the speed change ratio change, there would be a possibility for fuel non injection to occur for quite a number of times, and as a result an effect quite contrary to vibration suppression could occur.

The FIG. 6 flow chart shows a control routine for providing fuel injection to each cylinder individually, when restarting the supply of fuel from the state in which during deceleration the fuel supply was cut off.

First, in the step S21, a decision is made as to whether or not the fuel supply restart flag FSR is equal to 1, and if this flag is not equal to 1 then this is taken as meaning that the fuel supply cutoff is not to be cancelled, so that in the step S25 the injection of fuel is stopped, and then in the step S27 the fuel supply restart flag FSR and the fuel injection counter FIC are reset to 0, and this routine terminates.

If on the other hand the fuel supply restart flag FSR is equal to 1, then the flow of control proceeds to the step S22, and a decision is made as to whether or not the fuel injection counter FIC is equal to 0. If the fuel injection counter FIC is equal to 0, then in the step S26 normal fuel injection is performed for all of the cylinders, and in the step S27 the fuel supply restart flag FSR and the fuel injection counter FIC are reset, and this routine terminates.

By doing this, when fuel supply has been restarted according to the fuel injection pattern FIP, the system returns to providing normal fuel injection for all of the cylinders at the time point when the fuel injection counter FIC has been counted down from the predetermined value TIMPSR to zero.

When the fuel cutoff state has been exited by the throttle valve being opened with the lock up clutch 10 being released, the fuel injection counter FIC is not set to TIMPSR, but instead is set to be equal to 0. Accordingly, even if in the step S21 it is decided that FSR is equal to 1, the flow of control proceeds to the step S26 from the step S22, and from the beginning fuel is injected to all of the cylinders. And in the step S27 the fuel supply restart flag FSR and the fuel injection counter FIC are reset, thus being provided ready for control during the next episode of deceleration.

When it is determined in the step S22 that the fuel injection counter FIC is not 0, then in the step S23 this counter FIC is counted down, and in the step S24, according to the fuel injection pattern FIP in the RAM, the flag F(c) is set to 1 if injection is to be performed for this cylinder, while the flag F(c) is set to 0 if injection is not to be performed for this cylinder.

In concrete terms, an acceptable method of doing this is, the first time round, to set the flag F(c) to the information in the most significant (leftmost) bit in the fuel injection pattern FIP, and thereafter, as each cylinder comes round for possible fuel injection, after shifting the bit data in the fuel injection pattern FIP upwards (leftwards) by one bit, and to read out the bit information from that most significant bit position again and to set the flag F(c) to it.

In the step S28, a decision is made as to the value of the flag F(c), and if it is 0 then in the step S29 no fuel injection is performed for this cylinder, while if it is 1 then in the step S30 fuel injection is performed for this cylinder. In this manner, when restarting fuel injection, fuel injection is performed according to the fuel injection pattern FIP, starting from the cylinder which happens to come up first as a candidate for fuel injection.

Figure 8:
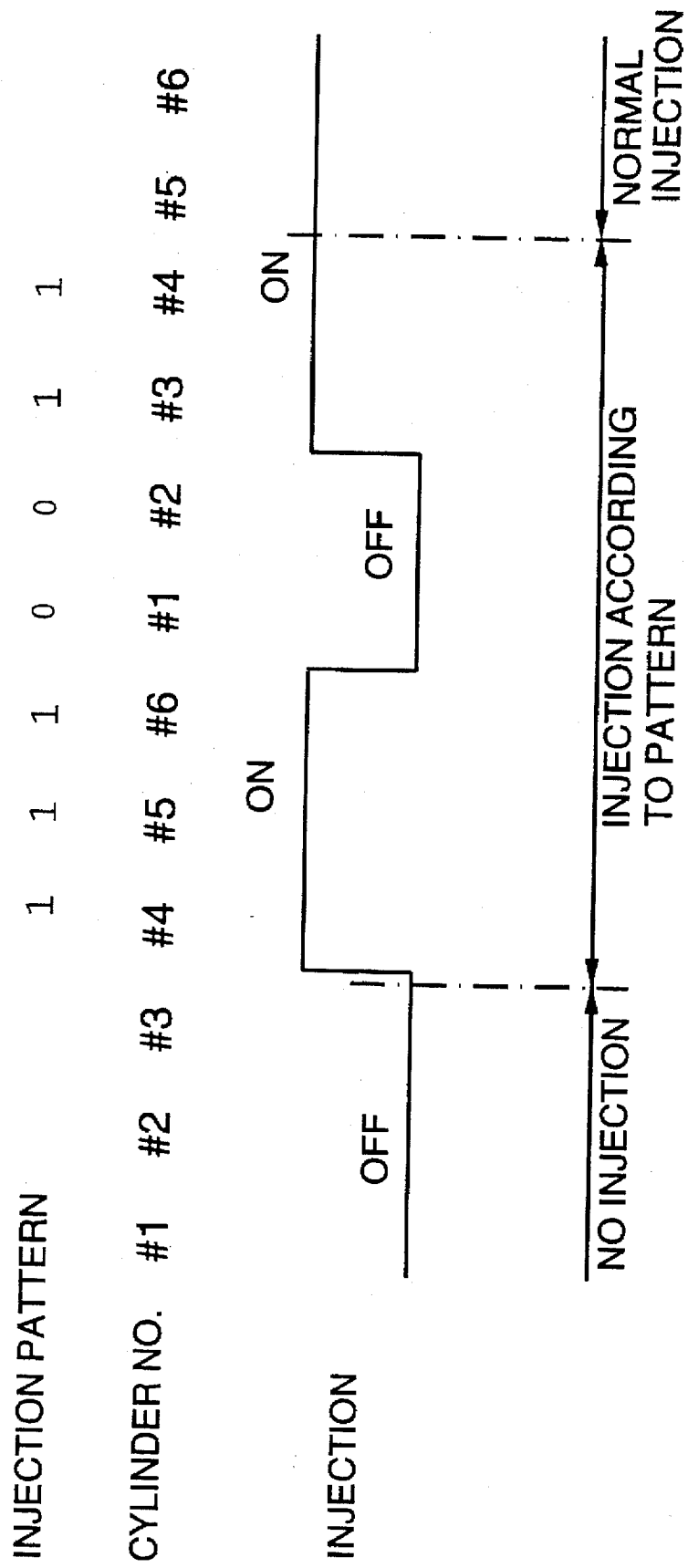
FIG. 8 is a diagram showing an example of fuel injection pattern according to this invention.

In the exemplary FIG. 8 time chart, after the restarting of fuel supply according to the fuel injection pattern "111001" is decided upon, the cylinder which happens to come up first as a candidate for fuel injection is the number 4 cylinder, and fuel injection is not performed for the fourth and the fifth cylinder, as determined by counting from this cylinder as "1". Although in this case this actually corresponds to the cylinders number 1 and number 2, if the cylinder which happened to come up first after the restarting of fuel supply had been a different one, the cylinders for which fuel injection was not performed would naturally have been different ones.

However, when initially restarting the supply of fuel, by determining the cylinders for which fuel is injected and the cylinders for which fuel is not injected according to the specified bit pattern, taking as a starting point the cylinder which happens to come up first as a candidate for fuel injection, without deciding in advance upon the selection of which actual individual cylinders should experience fuel injection and which should not, the fuel injection pattern is always the same for the same speed change ratio. For this reason, it is possible to generate the least amount of variation in the engine output torque by omitting fuel injection for certain of the cylinders at the most effective timing for suppression of vibration, at the current speed change ratio.

The above explanation relates to the case when the throttle valve was intentionally opened from the state in which the fuel was cut off upon deceleration. However, if the engine rotational speed drops while the idle switch continues to remain in the ON state, so that restarting of the supply of fuel is decided upon based upon the engine rotational speed, fuel injection control according to a fuel injection pattern or fuel injection to all of the cylinders is performed, in correspondence to the state of the lock up clutch 10 when the fuel supply is restarted, by a separate control routine.

Although the above described preferred embodiment was one in which this invention was applied to an engine which was linked via a torque converter equipped with a lock up clutch to a V-belt type CVT device, this invention can also be applied to an engine which is combined with a toroidal type CVT device, or to one which is combined with a CVT device which utilizes a magnetic clutch instead of the torque converter 12, or again to one which is combined with a manually operated transmission.

Further, in the above described preferred embodiment, the engine control unit 106 combined the function of injection pattern storing means, the function of injection pattern selecting means, and the function of control means which controlled the fuel injection valves 105 so as to bring the injection patterns into agreement. However, it would also be acceptable, as an alternative, to provide separate and independent circuits for serving each of these purposes.

Accordingly, although the present invention has been shown and described in terms of the preferred embodiment thereof, it is not to be considered as limited by any of the perhaps quite fortuitous details of said embodiment, or of the drawings, but only by the terms of the appended claims, which follow.

I claim:

1. A fuel supply control device for an engine, said engine having a plurality of cylinders for which fuel injection is performed individually in a fixed order, and being connected to means for transmitting a rotation of said engine at a speed change ratio selected from a plurality of candidate ratios, comprising:

accelerator means, means for supplying fuel to be injected into said cylinders in response to operation of said accelerator means, means for stopping the supply of fuel by said fuel supply means when a predetermined fuel supply stoppage condition holds, means for storing, according to speed change ratios, a plurality of fuel injection patterns which determine a specific cylinder for which fuel is to be injected and a specific cylinder for which fuel is not to be injected, means for selecting in said storing means a fuel injection pattern which corresponds to said selected speed change ratio when said accelerator means is operated after said stopping means has stopped the fuel supply, and means for controlling said supplying means so as to bring the fuel injection to be performed based on said selected fuel injection pattern.

2. A fuel supply control device according to claim 1, wherein said transmitting means comprises a continuously variable transmission.

3. A fuel supply control device according to claim 2, wherein said continuously variable transmission and said engine are connected together via a torque converter which comprises a lock up clutch which directly connects together said transmission and said engine, the control of said fuel supply means by said control means being limited to the condition when said transmission and said engine are directly connected together by said lock up clutch.

4. A fuel supply control device according to claim 1, wherein, in said fuel injection patterns, said specific cylinders for which fuel is to be injected and said specific cylinder for which fuel is not to be injected are determined according to a fuel injection order from a cylinder from which fuel injection is to be resumed.

5. A fuel supply control device according to claim 1, wherein said control means controls said fuel supply means only during a predetermined time period after said accelerator means is operated.

* * * * *